Patented May 23, 1939

2,159,263

UNITED STATES PATENT OFFICE 2,159,263

STABILIZATION OF POLYVINYL ACETAL RESINS

Charles R. Fordyce and Martti Salo, Rochester, N. Y., assignors to Eastman Kodak Company, Rochester, N. Y., a corporation of New Jersey No Drawing. Application August 14, 1937, Serial No. 159,193

8 Claims. (Cl. 260—73)

This invention relates to the stabilization of a polyvinyl acetal resin by subjecting either its polyvinyl intermediate or the resin itself to the action of nitrous acid which is usually applied in the form of its salt under acid conditions. The treatment of the resin may take place either in the reaction mixture, during its preparation, just prior to its precipitation from the reaction mixture, or on the resin itself after separating it from its reaction constituents.

The instability of polyvinyl acetal resins has been a problem in the art of making and using that type of resin. For instance, a product can be made therefrom and some time later the product may become dark and degraded, thus terminating its commercial usefulness.

One object of our invention is to prepare polyvinyl acetal resins which do not exhibit a tendency to degrade upon aging or darken when heated. Another object of our invention is to render polyvinyl acetal resins stable so that they may be employed for use in making commercial products whose life is not shortened by the breakdown of the resin which might otherwise occur without a stabilization treatment such as in accordance with our invention.

The instability of polyvinyl acetal resins may be manifested in various ways, such as by the brittleness and increased color of an aged film of the resin. This characteristic is, of course, very detrimental in most cases where a resin film may be employed.

In the laboratory the amount of stability is determined by subjecting the product to an elevated temperature for a prescribed period of time. One method of determining the stability is by heating a sample of the resin to a temperature of about 180° C. in a stream of nitrogen and measuring the decomposition products formed. These products are formed by passing the gases given off over heated copper oxide which oxidizes these gases to carbon dioxide and water, whereupon the carbon dioxide gas is collected and weighed.

Our preferred method of ascertaining stability is to heat a sample of the resin at about 110° C. for 24 hours and then measure the loss of viscosity of a 5% solution of the resin in acetic acid. The viscosity may be determined in any customary manner, such as by the use of a viscosimeter. In this test a polyvinyl acetal resin, which has not been stabilized, shows a decided drop in viscosity. The following data illustrates the drop in viscosity upon heating of an unstabilized polyvinyl acetal resin:

|  | Original viscosity (centipoises) | Viscosity after heating for 24 hours at 110° C. (centipoises) |
|---|---|---|
| Polyvinyl acetal resins which were not stabilized | 209 | 15 |
|  | 199 | 11 |
|  | 102 | 23 |

We have found that by subjecting either the polyvinyl intermediate, such as polyvinyl alcohol or polyvinyl acetate, to the action of nitrous acid in the reaction mixture employed to prepare the polyvinyl acetal resin or by the treatment of the polyvinyl acetal resin after its formation, a resin is formed which exhibits good stability as evidenced by testing it by the methods outlined above. Thus, polyvinyl acetal resins, which have been stabilized by our invention, can be employed to prepare commercial products without any darkening or degradation occurring in use. These stabilized acetal resins are particularly adapted to use in the commercial arts, such as in the making of photographic film.

Owing to the comparative instability of polyvinyl acetal resins, it is preferred that the treatment with the stabilizing agent occur prior to the heat-drying of the resin which occurs after separating it from its reaction mixture. If desired, the treatment may be applied before the washing of the resin so that the stabilizing compound will thereby be removed along with the other materials with which it is in contact. Nevertheless, a compound as described will, also, have a stabilizing effect if used as a stabilization treatment to the resin after it has been heat-dried, but preferably before the resin has been stored for a length of time sufficient to result in degradation.

We have found that it is unnecessary, however, that the stabilizing compound remain incorporated in the resin, the only requirement being that the resin or its polyvinyl intermediate be treated therewith either after its formation or during its preparation.

We have found that the most suitable quantity of nitrous acid to employ is approximately 1%, based on the weight of the polyvinyl intermediate employed in the reaction mixture. Quantities which are distinctly below 1% do not give satisfactory stabilization. It is preferred that a quantity of nitrite not above 5%, based on the weight of the polyvinyl intermediate, be employed, as above that amount the nitrite is not soluble in many of the useful reaction solvents and, therefore, would tend to separate from the solution. Where no question of solvents is involved, such as where the resin itself after separation from the reaction mixture is being treated, larger amounts of the nitrite may be employed as well as those proportions given.

The following examples illustrate the preparation of stable polyvinyl acetal resins in accordance with our invention:

Example I 150 parts of polyvinyl acetate was dissolved in 450 parts of ethyl alcohol. There was then added to this solution 75 parts of paraldehyde, 37½ parts of concentrated hydrochloric acid and 1½ parts of sodium nitrite. The solution was maintained at 40° C. for 4 days. It was then precipitated into water and the precipitated product was washed and dried. The viscosity of the dried polyvinyl acetal resin was not changed by heating 24 hours at 110° C. A similar resin prepared in the same way, excepting that no sodium nitrite was added, showed a drop in viscosity upon heating 24 hours at 110° C. to about ⅕ that of the original sample.

Example II 75 parts of polyvinyl alcohol of high viscosity was suspended in a mixture of 500 parts of ethyl alcohol, 19 parts of 35% hydrochloric acid and 100 parts of paraldehyde. A solution of 1.5 parts of sodium nitrite dissolved in 20 parts of 50% alcohol was added and the resulting mixture was allowed to stand with occasional stirring for 72 hours at 40° C. A uniform solution resulted which was precipitated into a large volume of water, washed and dried. After heating for 24 hours at 110° C., the polyvinyl acetal resin formed had a viscosity of 687 cps. as compared with a viscosity of 760 cps. before it was heated.

Example III 150 parts of polyvinyl acetate was dissolved in 450 parts of 70% acetic acid. A mixture of 37.5 parts of 35% hydrochloric acid, 31.5 parts of paraformaldehyde and 1.5 parts of sodium nitrite, dissolved in 20 parts of 50% alcohol, was added thereto. The reaction mixture was allowed to stand at 40° C. for 4 days. The resulting polyvinyl formal was separated therefrom by precipitating into water, washing and drying. The resin had a viscosity of 167 cps. when dissolved in acetic acid. A sample of the resin was heated for 24 hours at 110° C. and the viscosity of the treated resin was found to be 163 cps.

Example IV

The procedure outlined in Example III was followed except that the sodium nitrite was added just prior to the precipitation of the reaction mixture with water instead of at the beginning of the reaction. The product gave a viscosity before heating of 172 cps. and after heating of 170 cps.

Example V

The procedure of Example II was duplicated except that 75 parts of paraldehyde was employed instead of paraformaldehyde. The resulting polyvinyl acetal resin gave a viscosity of 94 cps. before heating and 88 cps. after heating 24 hours at 110° C.

Example VI 150 parts of polyvinyl acetate was dissolved in 450 parts of isopropyl alcohol. There was then added thereto 25 parts of sulfoacetic acid dissolved in an equal quantity of water and 75 parts of paraldehyde, and 1½ parts of sodium nitrite, dissolved in 20 parts of 50% alcohol. The whole was allowed to stand at 40° C. for 7 days. The resulting polyvinyl acetal resin was found to have a viscosity of 58 cps. before heating and 55 cps. after heating for 24 hours at 110° C.

Example VII

Example VI was duplicated except that 20 parts of concentrated sulfuric acid, dissolved in an equal quantity of water, was employed as the catalyst instead of the sulfoacetic acid. The resulting polyvinyl acetal resin had a viscosity of 68 cps. before heating and 59 cps. after heating for 24 hours at 110° C.

Example VIII

Example VI was duplicated except that 25 parts of 35% hydrochloric acid was employed as the catalyst instead of the mixture of sulfoacetic acid and water. The resulting resin had the same viscosity after heating for 24 hours at 110° C. as it did before heating.

Example IX 150 parts of polyvinyl acetate was dissolved in 375 parts of ethyl alcohol. The following was then added: 37.5 parts of 35% hydrochloric acid, 37.7 parts of butyraldehyde, 53.8 parts of paraldehyde and a solution of 1.5 parts of sodium nitrite in 20 parts of 50% alcohol. The resulting mixture was held at 40° C. for 4 days. The resulting polyvinyl butyracetal resin was separated therefrom by precipitating into water, washing and drying. The viscosity before heating was 110 cps. and after heating for 24 hours at 110° C. was 103 cps.

Example X

Example IX was duplicated except that the sodium nitrite solution was added to the reaction mixture just before the precipitation of the reaction product into water. The viscosity of the resin was 98 cps. before heating and 64 cps. after heating for 24 hours at 110° C.

Example XI

Example IX was duplicated except that 35.2 parts of benzaldehyde was employed instead of the butyraldehyde. The viscosity of the resulting resin was found to be substantially the same after heating for 24 hours at 110° C. as before.

Example XII

Example XI was duplicated except that the sodium nitrite solution was added just prior to the precipitation of the resin. The viscosity of the resin after heating for 24 hours at 110° C. was found to be substantially the same as before heating.

Other salts of nitrous acid, particularly the alkali metal salts which are characterized by easy solubility, may be employed in our invention. As the nitrous acid is ordinarily unstable, the use of salt rather than the acid in order to generate the nitrous acid in situ is preferred, however, it is understood that the acid itself might be employed if the feature of instability is avoided.

The following resins are exemplary of those which may be stabilized in accordance with my invention. It is to be understood that this list is not limiting but illustrative:

Polyvinyl acetate and other esters:
    Polyvinyl co-polymers (polyvinyl chloride-acetate)
    Polyvinyl acetaldehyde acetal
    Polyvinyl formaldehyde acetal
    Polyvinyl propionaldehyde acetal
    Polyvinyl butyraldehyde acetal
Mixed polyvinyl acetals such as:
    Polyvinyl formaldehyde-acetaldehyde acetal
    Polyvinyl butyraldehyde-acetaldehyde acetal
    Polyvinyl benzaldehyde-acetaldehyde acetal
    Polyvinyl furfuraldehyde-acetaldehyde acetal
    Polyvinyl acetone acetaldehyde ketacetal
    Polyvinyl cyclohexanone acetaldehyde ketacetal As may be seen from the examples, our stabilizing agent may be added either in the form of its salt in the presence of an acid or as the acid itself. As hydrochloric acid ordinarily is employed to promote the condensation of the polyvinyl compound with the aldehydes, under the preferred conditions even though the salt has been added, it will be liberated in the reaction mixture in the form of the acid.

The polyvinyl acetal resins, stabilized by our process, are particularly suitable for the preparation of photographic film or any other commercial product where the transmission of light is an important factor. Another instance of such a use is as an intermediate layer in the making of laminated or "safety" glass. These stabilized resins may, also, be employed for making artificial yarn, lacquers, molding compositions, impregnated textiles or laminated products. For instance, sheets of these stabilized resins may be laminated with layers of wood, metal, paper, glass, cellulose ester, etc. These stabilized resins may be employed for electrical insulation, especially where the insulated material, such as wire, is subjected to movement or bending. In some instances it may be found desirable to mix these stabilized polyvinyl resins with other plastic materials, such as cellulose acetate, acetate propionate or acetate butyrate; cellulose ethers, such as ethyl cellulose, gums, other resins, either natural or synthetic, waxes and oils.

Partial polyvinyl acetal resins may be stabilized in accordance with our invention. For example, if a polyvinyl butyraldehyde acetal resin, made by condensing butyraldehyde with polyvinyl alcohol according to French Patent No. 792,661 of Carbide and Chemicals Corporation in which from about 2.5 to about 4 molecules of polyvinyl alcohol are combined with each molecule of butyraldehyde, is dissolved in alcohol before heat-drying and subjected to the action of nitrous acid, a stable acetal resin results which is especially adapted to use for preparing an intermediate layer in the making of laminated glass. If desired, the acetal resin may be treated with the nitrous acid by adding it to the solution of the resin which is to be employed to make the commercial product, such as sheeting.

The acetals which may be stabilized by our process need not be complete acetals. The polyvinyl acetal resins listed herein may be either complete acetals or they may be resins having residual acetyl and/or hydroxyl groups remaining on the molecule.

We claim:

1. The process of stabilizing polyvinyl acetal resins which comprises subjecting a solution of a compound selected from the group consisting of the resins and the polyvinyl intermediates which are used in their preparation to the action of nitrous acid.

2. The process of stabilizing a polyvinyl acetal resin which comprises condensing an aldehyde with a polyvinyl fatty acid ester in the presence of nitrous acid.

3. The process of stabilizing a polyvinyl acetal resin which comprises treating the resin while in solution with nitrous acid.

4. The process of stabilizing a polyvinyl acetal resin which comprises subjecting a polyvinyl acetate to the action of nitrous acid and then preparing a polyvinyl acetal therefrom.

5. The process of stabilizing polyvinyl acetal resins which comprises subjecting a solution of a compound selected from the groups consisting of the resins and the polyvinyl esters which are used in their preparation to the action of an alkali metal nitrite in the presence of an acid.

6. The process of stabilizing polyvinyl acetal resins which comprises subjecting a solution of a compound selected from the groups consisting of the resins and the polyvinyl esters which are used in their preparation to the action of sodium nitrite in the presence of an acid.

7. The process of preparing a polyvinyl acetal resin which comprises subjecting a polyvinyl intermediate to the action of an aldehyde and sulfoacetic acid as the condensing agent.

8. The process of stabilizing polyvinyl acetal resins which comprises subjecting a solution of a compound selected from the group consisting of the resins of the polyvinyl intermediates which are used in their preparation to the action of a stabilizing agent selected from the group consisting of nitrous acid and an alkali metal nitrite in the presence of an acid.

CHARLES R. FORDYCE.
MARTTI SALO.